United States Patent
McMillen et al.

(10) Patent No.: US 6,900,900 B2
(45) Date of Patent: May 31, 2005

(54) APPARATUS AND METHOD FOR ENABLING HIGH RESOLUTION FILM THICKNESS AND THICKNESS-UNIFORMITY MEASUREMENTS

(75) Inventors: James A. McMillen, Foster City, CA (US); Evan Grund, San Jose, CA (US)

(73) Assignee: Process Diagnostics, Inc., Sunnyvale, CA (US)

( * ) Notice: Subject to any disclaimer, the term of this patent is extended or adjusted under 35 U.S.C. 154(b) by 541 days.

(21) Appl. No.: 09/991,459

(22) Filed: Nov. 16, 2001

(65) Prior Publication Data

US 2002/0057437 A1 May 16, 2002

Related U.S. Application Data

(60) Provisional application No. 60/249,600, filed on Nov. 16, 2000.

(51) Int. Cl.[7] .......................... G01B 11/02; G01B 9/02; G01N 23/00; G02B 27/42

(52) U.S. Cl. ....................... 356/504; 356/503; 356/484; 356/485; 250/390.06; 250/550

(58) Field of Search ................................. 356/504, 503, 356/484, 485; 250/390.06, 550

(56) References Cited

U.S. PATENT DOCUMENTS

| | | | | |
|---|---|---|---|---|
| 4,606,641 A | * | 8/1986 | Yamada et al. | 356/369 |
| 5,261,269 A | * | 11/1993 | Barker | 73/40.7 |
| 5,543,919 A | * | 8/1996 | Mumola | 356/632 |
| 5,658,418 A | * | 8/1997 | Coronel et al. | 156/345.25 |
| 6,137,575 A | * | 10/2000 | Sugiyama et al. | 356/503 |
| 6,301,492 B1 | * | 10/2001 | Zonenshayn | 600/378 |
| 6,406,924 B1 | * | 6/2002 | Grimbergen et al. | 438/9 |
| 6,476,921 B1 | * | 11/2002 | Saka et al. | 356/630 |
| 6,626,185 B2 | * | 9/2003 | Demos et al. | 134/1.1 |

* cited by examiner

Primary Examiner—Gregory J. Toatley, Jr.
Assistant Examiner—Khaled Brown
(74) Attorney, Agent, or Firm—Bo-In Lin

(57) ABSTRACT

A high-resolution and high-speed film thickness and thickness uniformity measurement method is disclosed in this invention. The disclosed method includes a step a) of measuring a film thickness at a single point on the top surface of the substrate using an interferometry with a measuring light beam having a range of wavelengths. The method further includes a step b) of selecting an optimal wavelength from the range of wavelengths applied for measuring the film thickness at the single point. The method further includes a step c) of measuring reflection intensities by scanning over a plurality of points with a measuring light beam of the optimal wavelength over the top surface of the substrate. The method further includes a step d) of calculating a film thickness at the plurality of points applying the optimal-wavelength reflection intensities at the plurality of points over the top surface of the substrate.

17 Claims, 3 Drawing Sheets

APPARATUS AND METHOD FOR ENABLING HIGH RESOLUTION FILM THICKNESS AND THICKNESS-UNIFORMITY MEASUREMENTS

This Application is a Formal Application and claims a Priority Date of Nov. 16, 2000, benefited from a previously filed Provisional Application 60/249,600 by the same Applicants of this Application.

BACKGROUND OF THE INVENTION

1. Field of the Invention

This invention relates generally to apparatus and method used to measure a film thickness. Particularly, this invention relates to a novel apparatus and method to perform rapid high-resolution measurements of film thickness and thickness uniformity on a semiconductor wafer.

2. Description of the Prior Art

Precise control and measurement of thin film thickness has become a challenge to those of ordinary skill in the art of integrated circuit (IC) manufacture. Particularly, as smaller and denser device geometry on integrated circuit (IC) chips are now built by the microelectronics industry for achieving increasing amounts of computing power. Specifically, the advent of denser, larger-scale integration has placed greater demand on the precise measurement of thin film thickness of a polysilicon layer. As the metal-oxide-field-effect transistor (MOSFET) is now favored over the bipolar transistor among the devices used in ICs, there are practical advantages, in most cases, to making the "metal" electrode in the MOS device and interconnection "wires" of polysilicon. Critical to the development, production and final performance of advanced IC's is the precise control of the polysilicon layer thickness and the doping density. The polysilicon layer is typically sandwiched between two $SiO_2$ layers, i.e., a thermal $SiO_2$ layer and a deposited $SiO_2$ inter-metal dielectric layer. The process monitoring and control is provided by post-fabrication metrology, performed outside the thin film deposition tools, for the evaluation of film thickness, doping density, uniformity, and defects.

There are several conventional methods of carrying out the processes of determining the film thickness by analyzing the light reflected from the film applying the measurement techniques of ellipsometry and interferomitry. The interferometer measurements utilize the partial reflections are generated when light passes between media with differing indices of refraction. When the thickness of film has a range of few wavelengths of light, an interference pattern is generated from interference between the light reflected from the top surface and the light reflected from the bottom surface. Analyses of these interference patterns generated from constructive and destructive interference at different wavelengths of light provide information related to the thickness of the film. When the refractive index is known, the film thickness can be determined through analyses of the interference patterns. FIG. 1 is a diagram showing the reflections of light from the top and bottom surfaces of a silicon wafer covered by a thin film upon which the light is projected for the purpose of determining a film thickness. The incident beam I is projected to the silicon wafer covered with a thin film and there are two reflected beams, i.e., R1 reflected from the top surface and R2 from the bottom surface according to Fresnel's formula. By applying a highly coherent light and by ignoring smaller internal reflections, effects of constructive and destructive interference can be observed. As the beam R2 travels additional optical path of 2nT than R1 where n is the refraction index of the film and T is the film thickness, a phase shift of the light is produced due to the optical path difference. The phase shift represented by $\Delta\phi$ between two paths is a function of a specific wavelength $\lambda$ and film thickness T, i.e., $\Delta\phi=4\pi T/\lambda$. By examining the patterns of interference between the reflected beam from the top surface of the film and the surface underneath the film, the thickness of the film can be determined. Different techniques of film thickness determinations are disclosed in various Patents such as U.S. Pat. Nos. 5,392,118, 5,403,433, 5,469,361, 5,587,792, and 5,604,581.

In addition to detecting the film thickness as discussed above, for the purpose of semiconductor manufacture, it is often desirable to determine the variations of film thickness over the surface of a silicon wafer. Conventional method of measuring the thickness variations are accomplished by placing the wafer on a motorized stage under an interferometer and positioning the wafer at a set of points on the wafer surface and carrying out a thickness measurement at each point. This method involves a start and stop of the stage wafer motion and thickness measurement by scanning a range of wavelengths at each point. Due to the operation requirements and length of time necessary to control the wafer stage motions and thickness determination measurements, conventional method can only be applied to measure the thickness at few points on the surface of the wafer surface typically 5, 13, and 49 points are measured. The thickness measurements made on these points are then presented as a contour map based on the data obtained from these points. As higher circuit densities are now formed on the silicon wafer, variation of film thickness measurements on 49 or even few hundred points over the entire wafer is gradually becoming insufficient. Higher resolution is required for measuring the thickness variations over the wafer surface to assure high quality of wafers are used to make integrated circuits with very high circuit density.

However, for those of ordinary skill in the art, improvement of film thickness measurement resolution by making the thickness measurement at more points is difficult because the number of required measurement points increases as the square of the increased density. The time required for motion control operations and scanning the range of wavelengths at each point as required for thickness determination by applying the reflection interference techniques described above grows linearly with the number of points measured and as the density squared. Therefore, a need still exists in the art to provide a new and improved technique to conduct film thickness variation measurement that can be practically carried out at higher resolution over the wafer surface to satisfy the requirement of modern ultra-high density integration now imposed on semiconductor industry.

SUMMARY OF THE PRESENT INVENTION

It is the object of the present invention to provide a new and improved apparatus and method to more rapidly carry out film thickness variation measurements over the wafer surface with higher resolution. A multiple-step measurement process is used to measure the variation of film thickness measurement to first determine the film thickness at one or few points on a wafer surface. Then determine an optimal wavelength for thickness variation measurement. Finally, the entire wafer surface is scanned with the optimal wavelength for detecting the thickness variation relative to a reference point based on the measurements obtained with a scanning beam with the optimal wavelength. High-resolution thickness variation measurements can be performed within reasonable length of time thus enabling those of ordinary skill in the art to overcome the above difficulties and limitations encountered in the prior art.

Specifically, it is an object of the present invention to present a new and improved thickness variation measurement by first performing a spectral scan at a single point for film thickness determination. An optical spectrometer is used for this measurement. Based on the resultant interference pattern of that measurement, an optimal wavelength is determined in that range of light frequencies that provides the relative maximum change-rate of reflectivity variations. An optical densitometer or reflectometer that is adjusted to the optimal wavelength, or a spectrometer that has its bandpass limited to a small range about the optimal wavelength, is employed for scanning of the entire wafer surface. The reflectivity measured with a single wavelength at large number of points is used to calculate thickness variations relative to the reference point where the spectral scan was performed.

Another object of the present invention is to provide a new and improved apparatus and method for carrying out the task of film-thickness variation measurements. The method is based on an assumption that the variations of thicknesses are relatively small as is typical for modern semiconductor thin film deposition tools. The method employs a multiple step process by first finding an optimal wavelength for measuring the thickness-variation by performing a spectral scan at one or few spots on the wafer surface or by a priori knowledge of the approximate film thickness. Then a thickness variation scan is rapidly performed by scanning the entire wafer using a scanning beam of the optimal scanning wavelength and recording the intensity of reflection at each point. The thickness variations are then calculated from the intensity of the reflection data. Refinement of the method is also provided by repeating the high density thickness variation scan by applying a different wavelength to remove any ambiguity if the variations of thickness over the wafer surface exceeds a maximum value beyond that which is determinable with the first optimal wavelength.

Briefly, in a preferred embodiment, the present invention discloses a method for measuring a thickness of a thin film formed on top of a substrate. The method includes a step a) of determining a film thickness at a single point on the top surface of the substrate, such as using interferometers with a measuring light beam having a range of wavelengths. The method further includes a step b) of selecting an optimal wavelength, which may be from the range of wavelengths applied for measuring the film thickness at the single point. The method further includes a step c) of measuring reflection intensities by scanning over a plurality of points with a measuring light beam of the optimal wavelength over the top surface of the substrate. The method further includes a step d) of calculating a film thickness at the plurality points applying the optimal-wavelength reflection intensities at the plurality points over the top surface of the substrate.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENT

Figure 2:
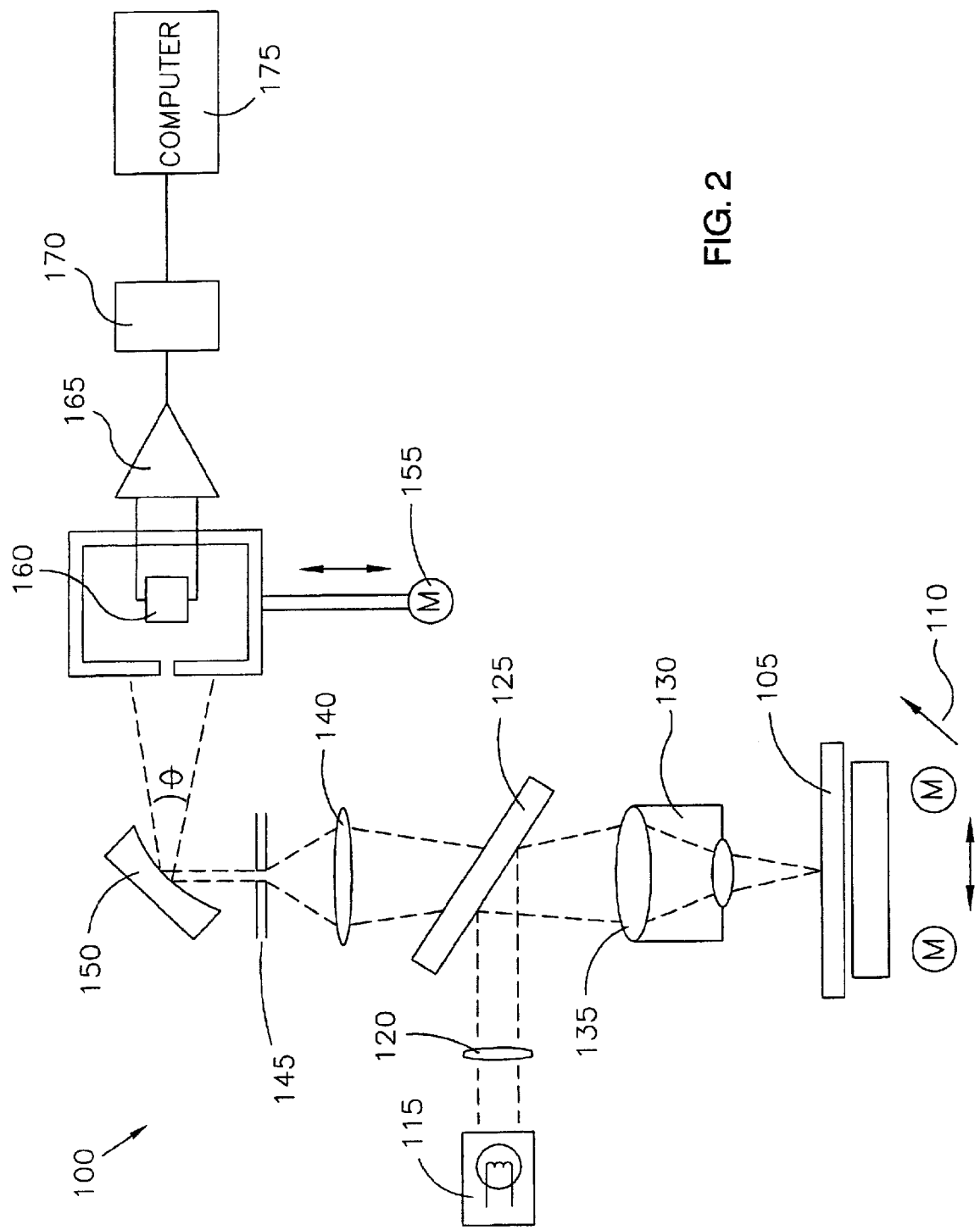
FIG. 2 is a functional block diagram of an optical film-thickness measurement system of this invention implemented with a single optical source measurement technique.

Referring to FIG. 2 for an optical film-thickness measurement system 100 of this invention for measuring a thin film formed on top of substrate 105 supported on a motorized two-dimensional (X-Y or R—θ) movement table 110. The substrate, e.g. a silicon wafer formed with a thin film on the top surface, is controlled to move along over a two-dimensional X-Y direction. The thickness measurement system 100 includes a light source 115 for emitting a light projected through an illumination lens 120 and a beam splitter 125 and then focused by a microscopic objective lens 130 on the top surface of the substrate 105. The measuring conical beam is focused into a very small spot on the substrate wafer 105 and maintained with light cone axis perpendicular to the top surface of the substrate 105 such that both the incident and reflective beams are conical with perpendicular axes. The reflected light-beams from the silicon wafer 105 and from the thin film are first collected by a microscopic projection lens 135. The reflected beams are then focused by a collection-optics 140 with the images of the substrate and the top surface focused on a fixed hole or slit 145. The light beams penetrate through the fixed hole or slit 145 are imaged onto a holographically ruled diffraction grating 150 and then dispersed into a spectrum. A scanning slit 155 is positioned to travel across the primary blaze angle range of the dispersed spectrum image of the hole or slit produced by the diffraction grating 150. The scanning slit has a size to allow only light with wavelength ranging from two to three nanometers to pass through. The light beam passes through the scanning slit 155 is projected onto a photo-detector implemented as a photomultiplier 160 for high sensitivity amplification with a high gain-low noise amplification characteristics. The output generated by the photomultiplier 160 is further amplified by an amplifier 165 and digitized by an analog to digital converter 170 as input data to a computer 175.

According to a process of this invention, the thickness is measured by first placing the silicon wafer 105 at a center position under the microscopic objective lens 130. Then the motorized scanning slit 155 is activated to move across the dispersed spectrum thereby measuring the intensity of the projected light beams at a number of different wavelengths. The measurement data resulted from the spectrum scan is collected by the computer 175. The computer employs the collected data to perform a calculation to determine the interferogram and the film thickness and select a wavelength between the maximum and minimum reflections. After an optimal scanning wavelength is determined from above processes, the scanning slit 155 is set at a position corresponding to the selected wavelength. A scan process over the entire wafer 105 is performed with the motorized two-dimensional (X-Y or R—θ) table 110 making movements according to a raster fashion or circular rings. The data representing the beam intensities of the reflected beams are collected for each of the X-Y or R—θ positions scanned with this selected single wavelength. The relative changes of beam intensities from the measurement obtained at the center location are used to calculate the film thickness for every measurement point over the entire top surface of the wafer 105. The calculated thickness according to the measured data for many points over the top surface of the wafer substrate 105 can be printed out or displayed as a graphic presentation for the user of this thickness measurement system.

Figure 3:
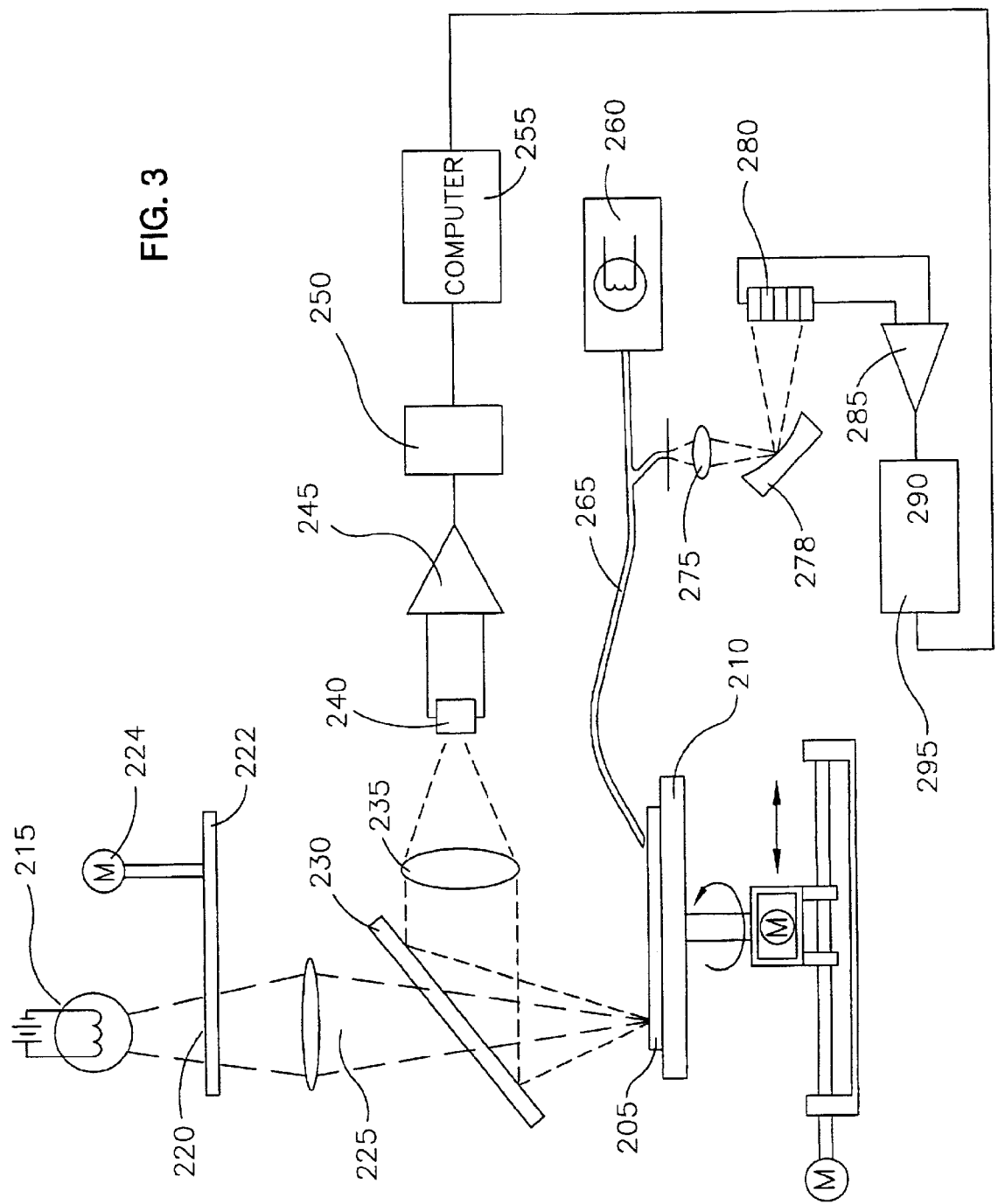
FIG. 3 functional block diagram of an optical film-thickness measurement apparatus of this invention implemented with dual optical source measurement technique.

A formula that represents the change in film thickness as a function of reflectance intensity is employed to determine the film thickness by using the reflectance data. The reflectance data is obtained from scanning the top surface of the thin film with an optical densitometer at a single wavelength. FIG. 3 as further described below further illustrates the measurements made with a densitometer. A typical example is the measurement of the thickness uniformity of a silicon dioxide layer that is grown or deposited upon a silicon wafer's surface in the manufacturing of an integrated circuit. Specifically, the reflected light from the surface as measured by the densitometer contributed primarily from the sum two reflections. The first reflection is from of the surface at the air/film interface. The second reflection is the reflected light that passes down through the film and reflects from the bottom surface of the film (the film/silicon interface) and passes back up through the film and exits the film. The relative amplitude of these two reflections is typically 4 to 1 with the light that passed through the film twice being the larger. Reflection intensities at interfaces is described by Fresnel's Formula for light of normal incidence, $[(N-1)/(N+1)]^2$, where the relative indices of refraction, N, are 1.5 ($n_{SiO2}/n_{Air}$=1.5/1) as the light passes from air to $SiO_2$, and 2.33 going from oxide to Si($n_{Si}$~3.5). The relative phase of these two reflections is shifted by the optical thickness of the light path down and up through the film: $\Delta\phi = 4\pi nT/\lambda$ where $\Delta\phi$ is the observed phase shift of light of wavelength $\lambda$ passing twice through a film of thickness T with index of refraction n.

With the simplifying assumptions of ignoring the non-linearity of indices of refraction with wavelength, the absorption of light in the film, light scattering from surface roughness, etc., the measured reflectance, R, can be represented in normalized terms as:

$$R = 0.8 + 0.2 \cos(4\pi nT/\lambda) \qquad \text{(Equation 1)}$$

With a constant wavelength, based on Equation 1, changes of reflectance due to variation of thickness can be represented as dR/dT:

$$dR/dT = -0.8\pi n/\lambda \sin(4\pi nT/\lambda). \qquad \text{(Equation 2)}$$

Equation 2 shows that depending on the ratio of thickness to wavelength, i.e., $T/\lambda$, the reflectivity can be increasing or decreasing with small variations in thickness. Also the amount of reflectance is non-linear with respect to thickness.

Figure 1A:
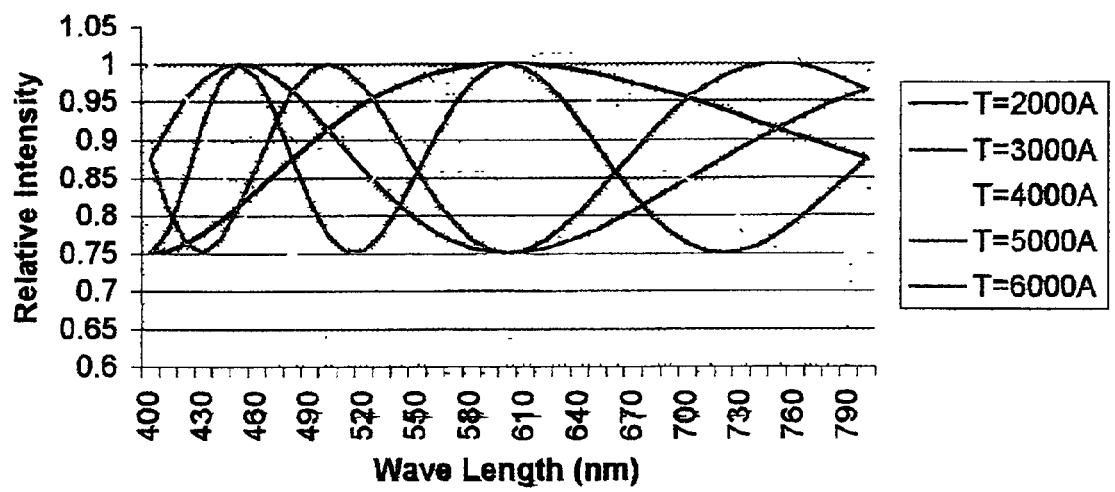
FIGS. 1A and 1B are interferogram diagrams showing the relative intensity of reflective light beams as function of wavelength over a range of film thickness.
Figure 1B:
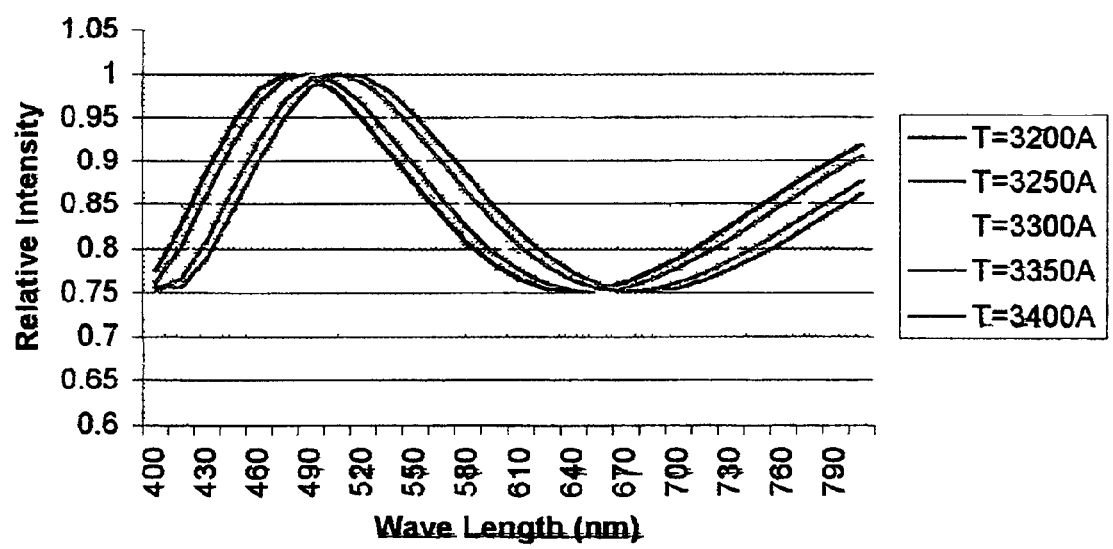

With a preferred embodiment as that shown in FIG. 1, a thickness is measured at the center of the wafer, $T_c$, by scanning a range of wavelengths. A curve fitting is performed to obtain the best fit. A single wavelength $\lambda_s$ is selected for the densitometer to scan the entire wafer surface. In order to obtain the maximum sensitivity of measurement and have a symmetrical range of offsets from $T_c$, a selection of an optimal wavelength $\lambda_s$ is determined by making the second derivative zero:

$$\cos(4\pi nT/\lambda) = 0. \qquad \text{(Equation 3)}$$

The condition of Equation 3 is satisfied when $4\pi nT/\lambda = \pi/2$, $3\pi/2$, $5\pi/2$, $7\pi/2$, ..., thus there are multiple solutions of $\lambda$ and that can be represented as:

$$\lambda = 8nT/(2i-1), i=1, 2, 3, \qquad \text{(Equation 4)}$$

Based on Equation 2, since there is a wavelength $\lambda$ in the denominator, a practical optimal wavelength can be selected by selecting a longest wavelength to make the slope dR/dT smaller thereby increasing the sensitivity of reflectance changes versus thickness variations. Letting $T_c$ be the thickness of the center point of the wafer and that is commonly considered as a typical thickness for the wafer, the longest wavelength that meets the above criteria is determined by selecting a smallest integer $i_p = 1, 2, 3, \ldots$ and meanwhile satisfy the condition of:

$$4nT_c/i_p \leq \lambda_{max}, \qquad \text{(Equation 5)}$$

where $\lambda_{max}$ is the maximum wavelength of the densitometer range. A practical minimum integer is determined as an integer that satisfies a condition of:

$$i_p \geq 4nT_c/\lambda_{max} + 0.5, \qquad \text{(Equation 6)}$$

Thus, the desired scanning wavelength $\lambda_s$ can be represented as:

$$\lambda_s = 8nT_c/(2i_p - 1). \qquad \text{(Equation 7)}$$

From Equation 1, the film thickness T can be defined in terms of reflectance R as:

$$T = (\lambda_s/4\pi n) \cos^{-1}(5R-4). \qquad \text{(Equation 8)}$$

Again, multiple solutions is possible, and an unique solution can be determined by a functional relationship between a measured thickness T and the center thickness $T_c$ that is represented as:

$$T = T_c - \sin(4\pi nT_c/\lambda_s)(\lambda_s/4\pi n)[\cos^{-1}(5R-4)-\pi], \qquad \text{(Equation 9)}$$

where the value of $\cos^{-1}$, i.e., the "arc cosine" is restricted to principal values between $[-\pi, \pi]$.

Equation 9 can be further applied to improve the precision during the processes in empirically carrying the spectral measurements at the center of the wafer so that the all the measured points can be calculated as offsets from the center point. Specifically, Equation 9 can be further understood by taking notice of the following factors:

1) $T_c$ is the center thickness and the starting point for calculating thickness offsets,
2) $\sin(4\pi nT_c/\lambda_s)$ is a term that equals to either +1 or −1 by definition and changes sign when there is a change in the slope polarity as the change in reflectance may increase or decrease with thickness, and
3) The term $(\lambda_s/4\pi n)[\cos^{-1}(5R-4)-\pi]$ defines the change in thickness for a change in reflection where 5R−4 defines the range in reflections. Re-scaling R from [0.6, 1] to the range [−1, +1], causes $[\cos^{-1}(5R-4)-\pi]$ to have the range $[\pi, -\pi]$, so $(\lambda_s/4\pi n)[\cos^{-1}(5R-4)-\pi]$ has the range $[(\lambda_s/4n), -(\lambda_s/4n)]$. $(\lambda_s/4\pi n)$ is the scale factor.
4) The shift of $\pi$ for $\cos^{-1}(5R-4)$ moves T from a minimum R to an average value of R, which corresponds to $T_c$.

During the full spectrum scan of the wafer's center point, the highest wavelength peak and valley points are located. These values can be used to adjust the theoretical thickness value generated by Equation 9, accounting in part for effects such as light absorption in the film. As there were many assumptions made to reach this value, applying some actual values will produce more accurate results.

Let the highest reflection $R_p$ measured with a "peak-wavelength" $\lambda_p$ and, and the lowest reflection $R_v$ measured with a "valley-wavelength" $\lambda_v$, and There are 4 cases:
1. During the spectral scan if the highest wavelength peak or valley found is a peak, $\lambda_p$, and the selected scan wavelength, $\lambda_s$, and $\lambda_p < \lambda_s$.

2. During the spectral scan if the highest wavelength peak or valley found is a peak, $\lambda_p$, and the selected scan wavelength, $\lambda_s$, and $\lambda_p > \lambda_s$.
3. During the spectral scan if the highest wavelength peak or valley found is a valley, $\lambda_v$, and the selected scan wavelength, $\lambda_s$, and $\lambda_v < \lambda_s$.
4. During the spectral scan if the highest wavelength peak or valley found is a valley, $\lambda_v$, and the selected scan wavelength, $\lambda_s$, and $\lambda_v > \lambda_s$.

Then Equation 9 becomes $$T = T_c + K (\lambda_s/4\pi n) [\cos^{-1} \{[2(R-R_s)-R_p-R_v]/(R_p-R_v)\} - \pi] \quad \text{(Equation 10)}$$

where K=1 for cases 1 and 4 and K=−1 for cases 2 and 3, and $R_s$ is the measured reflectance at $\lambda_s$.

Referring to FIG. 3 for another preferred embodiment of this invention. The novel optical film-thickness measurement system 200 is a dual optical measurement system that includes scanning densitometer shown on the upper portion of FIG. 3 and a spectrophotometer with a fiber sensing system shown on the right-lower portion of the drawing. Both of these measurement systems are mounted above the substrate 205 for film thickness measurement mounted on a motorized rotational table 210 for linear and rotational (R—θ) movements over the X-Y plane. The thickness measurement system 200 includes a densitometer light source 215 for emitting a light projected through an color filter 220 that limits the spectral bandwidth to a few nanometers of wavelength. The small range of wavelength can be changed with a motorized wheel 222 controlled and driven by a color selection motor 224 to position different kinds of filters 220 into the optical path. The filtered beam with selected wavelength is projected through objective lens 225 and a beam splitter 230 to focus on the top surface of the substrate 205. The measuring conical beam is focused into a very small spot on the substrate wafer 205 and maintained with the light cone axis perpendicular to the top surface of the substrate 205 such that both the incident and reflective beams are conical with perpendicular axes. The reflected light-beams from the silicon wafer 205 and from the thin film are first projected by the beam splitter 230 to a collection lens 235 to focus on a photo-detector 240 to generate photo-electric signals. The detected photo-electric signals are then amplified by a signal amplifier 245 and then converted by an analog to digital converter 250 to digital signals. The output digital data from the A-to-D converter 250 are then inputted to a computer 255 for data processing and analysis operations.

The spectrophotometer has spectrophotometer light source 260 transmitting the light through one half of a bifurcated optical fiber bundle 265 to the top surface of the wafer 205. The reflected light from the top surface and the top surface of the thin film are transmitted via the other half of the bifurcated optical fiber bundle 265 to a lens 270 focusing onto a diffraction grating 275 for generating dispersed light onto a photo-diode (or CCD) array 280. After an integration interval, the collected charges produced in the diodes are shifted out of one-diode at a time and amplified by an amplifier 285. The amplified signal generated by the amplifier 285 are converted to a digital data by an analog to digital converter 290 and held in a shift register 295. The resulting spectral data are inputted to the computer 255 for further analyses to be discussed below.

For measuring the film thickness, the wafer 205 controlled by the motorized rotational table 210 to position at a center right under the spectrometer fiber optics. A spectrum scan is carried out and all the scan data are stored in the computer. The interferogram and the film thickness are calculated to select a wavelength between the maximum and minimum reflection. Then the color wheel 222 is set at a wavelength corresponding to the selected wavelength. The entire top surface of the wafer 205 is scanned with the selected wavelength by rotating and moving the motorized rotation table 210 with increased annuli starting from the center of the wafer 205. The intensities of the reflected light are recorded for each point defined by the polar coordinates (θ, r). The thickness at each point is calculated with the measured differences of the reflection intensities from a reference reflection-intensity measured at the center point of the wafer 205. The functional relationship between the thickness variations and reflection intensity measurements can be substantially represented by Equations 9 or 10. Reports and graphic representation of the thickness measurements and calculations can be displayed to a user of the optical film-thickness measurement system.

Based on above descriptions, this invention discloses a method for measuring a thickness of a thin film formed on top of a substrate. The method includes a step a) of measuring a film thickness at a single point on the top surface of the substrate using an interferometry with a measuring light beam having a range of wavelengths. The method further includes a step b) of selecting an optimal wavelength from the range of wavelengths applied for measuring the film thickness at the single point. The method further includes a step c) of measuring reflection intensities by scanning over a plurality of points with a measuring light beam of the optimal wavelength over the top surface of the substrate. The method further includes a step d) of calculating a film thickness at the plurality of points applying the optimal-wavelength reflection intensities at the plurality of points over the top surface of the substrate. In a preferred embodiment, the step d) of calculating a film thickness at the plurality of points over the top surface of the substrate is a step of calculating an offset of the reflection intensities at each of the plurality of points from a reflection intensity over the single point measured in step a) using the interferometer with a measuring light beam having a range of wavelengths. In another preferred embodiment, the step a) of measuring the film thickness at the single point is a step of employing a spectrophotometer. And, the step c) of measuring reflection intensities by scanning over a plurality points with a measuring light beam of the optimal wavelength over the top surface of the substrate is a step of employing a densitometer for scanning over a plurality points over the top surface.

Therefore, the present invention provides a new and improved apparatus and method to more rapidly carrying out film thickness-variation measurements over the wafer surface with higher resolution. The film thickness variation measurement is performed by carrying out a multiple-step measurement process to first determine an optimal wavelength for thickness variation measurement at one or few points on a wafer surface. Then the entire wafer surface is scanned with the optimal wavelength for detecting the thickness variation relative to a reference point based on the measurements obtained with a scanning beam with the optimal wavelength. High-resolution thickness variation measurements can be performed within reasonable length of time thus enabling those of ordinary skill in the art to overcome the difficulties and limitations encountered in the prior art. Specifically, a spectral scan at a single point for film thickness determination is first carried out over a range of different wavelengths. Based on the results of measurement, an optimal wavelength is determined in identifying a light frequency that provides a point in the interference pattern having relative maximum change-rate of reflectivity variations. A scan of the entire wafer surface is then performed with the optimal single wavelength at large number of scanning points for collecting data to calculate thickness variations relative to the reference point where the optimal wavelength measurements are performed. The method is based on an assumption that the variations of thickness are relatively small. Refinement of the method is also provided by repeating the high density thickness variation scan by applying a different wavelength to remove any ambiguity if the variations of thickness over the wafer surface exceeds a maximum value beyond that is determinable with the first optimal wavelength.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A method for measuring a thickness of a thin film formed on a top surface of a substrate comprising:
   a) measuring a film thickness at a single point on said top surface of said substrate using an interferometer with a measuring light beam having a range of wavelengths;
   b) selecting an optimal wavelength within said range of wavelengths applied for measuring said film thickness at said single point;
   c) measuring reflection intensities by scanning over a plurality of points with a measuring light beam of said optimal wavelength over said top surface of said substrate; and
   d) determining a film thickness of said plurality of points using said reflection intensities measured from scanning over said plurality of points with said measuring light beam of said optimal wavelength over said top surface of said substrate.

2. The method of claim 1 wherein:
said step d) of determining a film thickness at said plurality points over said top surface of said substrate includes a step of determining an offset of said reflection intensities at each of said plurality of points from a reflection intensity of said single point measured in said step a).

3. The method of claim 1 wherein:
said step a) of measuring said film thickness at said single point is a step of employing a spectrophotometer; and
said step c) of measuring reflection intensities by scanning over a plurality points with a measuring light beam of said optimal wavelength over said top surface of said substrate is a step of employing a densitometer for scanning over a plurality points over said top surface.

4. The method of claim 1 wherein:
said step a) of measuring said film thickness at said single point using an interferometer with a measuring light beam having a range of wavelengths is a step of employing a color filter, such as a defraction grating and a scanning slit, for adjusting over said range of wavelengths;
said step c) of measuring reflection intensities by scanning over a plurality of points with a measuring light beam of said optimal wavelength over said top surface of said substrate is a step of employing said interferometer detector by fixing said detector to measure only said optimal wavelength for scanning over a plurality of points over said top surface.

5. The method of claim 1 wherein:
said step b) selecting an optimal wavelength within said range of wavelengths is a step of determining a sensitivity of reflectance change at different wavelengths and selecting said optimal wavelength having a highest sensitivity of reflectance change.

6. The method of claim 1 wherein:
said step b) selecting an optimal wavelength within said range of wavelengths is a step of selecting an optimal wavelength functionally related to said film thickness measured at said single point and a refractive index of said thin film.

7. The method of claim 1 wherein:
said step a) of measuring a film thickness at a single point on said top surface of said substrate is a step of measuring a film thickness at a center of said substrate; and
said step b) selecting an optimal wavelength within said range of wavelengths is a step of selecting an optimal wavelength $\lambda_s$ functionally proportional to said film thickness $T_c$ at said center of said substrate and refractive index n of said thin film substantially according to a relationship of $\lambda_s = K\ nT_c$ where K is a constant determined for specific film thickness ranges.

8. A method for measuring a thickness of a thin flint formed on a top surface of a substrate comprising:
spectral scanning a single point on said top surface of said substrate followed by selecting a single wavelength for spatial scanning over a plurality of points of said top surface for determining a thickness profile of said thin film wherein said step of selecting a single wavelength is a step of selecting an optimal wavelength functionally related to a film thickness measured at said single point by said spectral scanning and the refractive index of said thin film.

9. An apparatus for measuring a thickness of a thin film formed on a top surface of a substrate comprising:
an interferometry means for measuring a film thickness at a single point on said top surface of said substrate employing a measuring light beam having a range of wavelengths;
a computing means for selecting an optimal wavelength within said range of wavelengths applied for measuring said film thickness at said single point;
a scanning means for scanning over a plurality of points over said top surface with said optimal wavelength; and
a film thickness determination means for collecting a reflection intensity from each of said point scanned with said optimal wavelength for determining a thickness at each of said plurality of points over said top surface of said substrate.

10. The apparatus of claim 9 wherein:
said film thickness determination means further includes a thickness offset determination means for determining a thickness offset at each of said plurality points relative to said single point.

11. The apparatus of claim 9 wherein:
said interferometry means for measuring said film thickness at said single point is a spectrophotometer; and
said thin film determination means is a densitometer for scanning over a plurality points over said top surface.

12. The apparatus of claim 9 wherein:
said interferometry means includes a defraction grating and scanning slit for adjusting said measuring beam at said single point over said range of wavelengths; and said thickness determination means includes a defraction grating and scanning slit fixing means for fixing said scanning slit corresponding to said optimal wavelength for scanning over a plurality points over said top surface.

13. The apparatus of claim 9 wherein:

said computing means includes a reflectance sensitivity computing means for determining a sensitivity of reflectance change at different wavelengths and selecting said optimal wavelength having a highest sensitivity of reflectance change.

14. The apparatus of claim 9 wherein:

said computing means includes an optimal wavelength selecting means for selecting an optimal wavelength functionally related to said film thickness measured at said single point and a refraction index of said thin film.

15. The apparatus of claim 9 wherein:

said interferometry means further includes a moving stage for moving said interferometry means to different position over said top surface of said substrate; and said computing means includes an optimal wavelength selecting means for selecting an optimal wavelength $\lambda_s$ functionally proportional to a film thickness Tc measured at a center of said substrate and a refractive index n of said thin film substantially according to a relationship of $\lambda_s = K\, n T_c$ where K is a constant for specific film thickness ranges.

16. An apparatus for measuring a thickness of a thin film formed on a top surface of a substrate comprising:

a spectral scanning means for scanning a single point on said top surface of said substrate with a range of wavelengths and a spatial scanning means for spatially scanning over a plurality of points of said top surface with a single wavelength for determining a thickness profile of said thin film.

17. The apparatus of claim 16 further comprising:

a computing means for selecting said single wavelength functionally related to a film thickness measured at said single point and refractive index of said thin film.

* * * * *